(12) United States Patent
Tanaka et al.

(10) Patent No.: US 7,365,721 B2
(45) Date of Patent: Apr. 29, 2008

(54) PROJECTION DISPLAY (75) Inventors: Takaaki Tanaka, Hirakata (JP);
Atsushi Hatakeyama, Ibaraki (JP);
Shigekazu Yamagishi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 602 days.

(21) Appl. No.: 10/515,244

(22) PCT Filed: Apr. 16, 2003

(86) PCT No.: PCT/JP03/04858

§ 371 (c)(1),
(2), (4) Date: Nov. 19, 2004

(87) PCT Pub. No.: WO2004/005999

PCT Pub. Date: Jan. 15, 2004

(65) Prior Publication Data

US 2006/0103592 A1    May 18, 2006

(30) Foreign Application Priority Data

Jul. 8, 2002    (JP) .............................. 2002-198385

(51) Int. Cl.
*G09G 1/14*    (2006.01)
(52) U.S. Cl. .......................... 345/87; 359/93; 349/102; 349/103
(58) Field of Classification Search .................. 345/87; 359/93; 349/102, 103
See application file for complete search history.

(56) References Cited

U.S. PATENT DOCUMENTS 5,658,060 A * 8/1997 Dove ........................... 353/33
6,404,558 B1 * 6/2002 Chuang et al. ............. 359/634
6,937,283 B1    8/2005 Kessler et al.
2001/0010594 A1 * 8/2001 Oono ......................... 359/497

FOREIGN PATENT DOCUMENTS

JP          64-3834          1/1989

(Continued)

*Primary Examiner*—Amare Mengistu
*Assistant Examiner*—Afroza Y Chowdhury
(74) *Attorney, Agent, or Firm*—Hamre, Schumann, Mueller & Larson, P.C.

(57) ABSTRACT

The present invention provides an inexpensive projection display that allows a pixel grid as ineffective portions of respective pixels of a light valve to be made inconspicuous. The projection display includes a birefringent element (43) for spatially separating light from a transmission liquid crystal light valve (39). The birefringent element (43) includes a first birefringent plate (40) that the light from the liquid crystal light valve (39) enters, a second birefringent plate (41) that light from the first birefringent plate (40) enters, and a third birefringent plate (42) that light from the second birefringent plate (41) enters. A polarization direction of the light entering the first birefringent plate (40) forms an angle of n×45° (n is an integer other than 0) with an optic axis of the first birefringent plate (40) projected on an incident surface of the first birefringent plate (40). An optic axis of the second birefringent plate (41) projected on an incident surface of the second birefringent plate (41) is orthogonal to the optic axis of the first birefringent plate (40) projected on the incident surface of the first birefringent plate (40). An optic axis of the third birefringent plate (42) projected on an incident surface of the third birefringent plate (42) extends horizontally or vertically.

22 Claims, 8 Drawing Sheets

FOREIGN PATENT DOCUMENTS

| | | |
|---|---|---|
| JP | 2-311887 | 12/1990 |
| JP | 3-31813 | 2/1991 |
| JP | 4-113308 | 4/1992 |
| JP | 10-133277 | 5/1998 |
| JP | 11-167105 | 6/1999 |
| JP | 2000-241897 | 9/2000 |
| JP | 2001-324698 | 11/2001 |
| WO | 89/06417 | 7/1989 |
| WO | 96/12978 | 5/1996 |
| WO | 01/26384 | 4/2001 |

\* cited by examiner

| | First birefringence plate | Second birefringence plate | Third birefringence plate |
|---|---|---|---|
| (1) | 45° | -45° | 0°  180° |
| (2) | -45° | 45° | 0°  180° |
| (3) | 45° | 135° | 90°  -90° |
| (4) | -45° | -135° | 90°  -90° |
| (5) | 135° | -135° | 0°  180° |
| (6) | -135° | 135° | 0°  180° |
| (7) | 135° | 45° | 90°  -90° |
| (8) | -135° | -45° | 90°  -90° |

Optic axis projected on incident surface

PROJECTION DISPLAY

TECHNICAL FIELD

The present invention relates to a projection display that irradiates an image formed on a light valve with illumination light and then projects the image on a screen in a magnified state through a projection lens.

BACKGROUND ART

In order to obtain a large screen image, there has been used a projection display that allows light from a light source to illuminate a small light valve forming an image in accordance with a picture signal and this optical image to be projected on a screen in a magnified state through a projection lens. In such a projection display, an active-matrix, transmission liquid crystal light valve that modulates light by utilizing polarization has been employed as the light valve in wide-spread practical use. The transmission liquid crystal light valve includes a liquid crystal cell formed by sealing 90-degree twisted nematic liquid crystal between two glass substrates opposing each other and two polarizing films disposed on both sides of the liquid crystal cell so that their transmission axes are orthogonal to each other. By the use of such a transmission liquid crystal light valve, it becomes possible to miniaturize projection displays and also to obtain high-brightness, high-quality large screen images. However, the problem has been noted that, when a light valve having a fixed-pixel structure is used, a pixel grid on a projected image is conspicuous, resulting in the deteriorated image quality. In particular, the numerical aperture, i.e., a ratio of an effective pixel area to a whole pixel area, of transmission light valves is in the range of 40% to 70%, which is lower than that of reflection light valves. Therefore, when a transmission light valve is used, a pixel grid as ineffective portions (such as wirings and TFT (Thin Film Transistor) parts) of respective pixels is conspicuous. In this case, the pixel grid becomes more conspicuous with the increase in the angle of view (due to the increase in the screen on which the image is projected or the decrease in the distance from a viewer to the screen).

In order to make the pixel grid inconspicuous, there has been proposed disposing a pixel separation optical element including a birefringent element for separating incident light into ordinary rays and extraordinary rays and a quarter-wave plate for recovering the polarization between a light valve and a projection lens, so that respective pixels on a projected image are separated at least in two directions (see JP 64(1989)-3834 U and JP 11(1999)-167105 A, for example).

Figure 9:
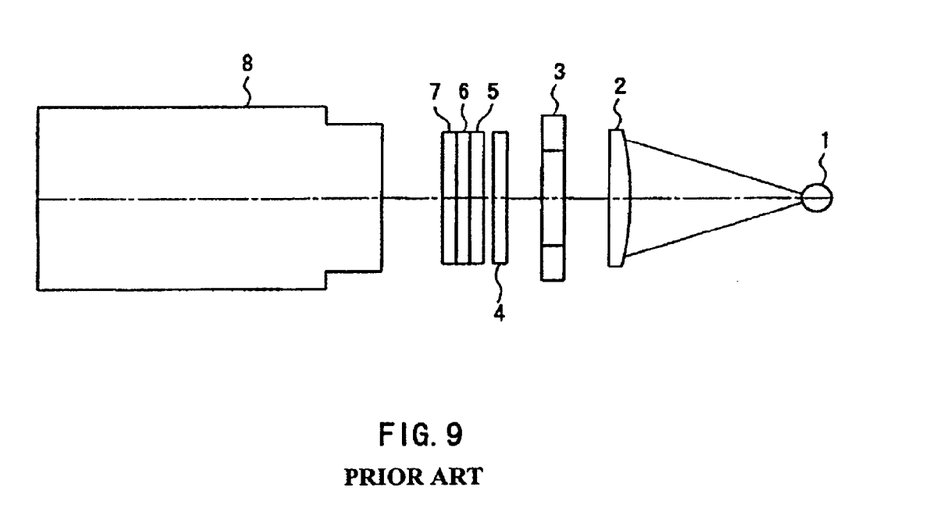
FIG. 9 is a schematic view showing a configuration of a conventional projection display.

FIG. 9 shows a schematic configuration of a conventional projection display. As shown in FIG. 9, the conventional projection display includes: a light source 1; a condenser lens 2 for gathering light from the light source 1; a liquid crystal light valve 3 that is illuminated by the gathered light from the condenser lens 2 and forms an image in accordance with a picture signal; a first quarter-wave plate 4 for converting linearly polarized light emitted from the liquid crystal light valve 3 into circularly polarized light; a first birefringent plate 5 for separating the light that has been converted into circularly polarized light by the first quarter-wave plate 4 into two circularly polarized light beams that are spatially separated and then converting them into linearly polarized light beams orthogonal to each other; a second quarter-wave plate 6 for converting the two linearly polarized light beams that are spatially separated into circularly polarized light beams; a second birefringent plate 7 for separating the light that has been converted into the circularly polarized light by the second quarter-wave plate 6 into linearly polarized light beams that are orthogonal to the directions of separation by the first birefringent plate 5; and a projection lens 8 for projecting the light beams that have been separated by the second birefringent plate 7 on a screen in a magnified state. According to this configuration, each of the pixels is projected as four spatially separated pixels on a projected image, thereby allowing a pixel grid as ineffective portions of the pixels to be made inconspicuous.

As examples of a pattern in which the respective pixels are separated spatially on a projected image to allow the pixel grid to be made inconspicuous, the following patterns are conceivable: a parallel two-point separation pattern in which light is separated into two light beams that are spatially separated in the horizontal direction or the vertical direction; an oblique two-point separation pattern in which light is separated into two light beams that are spatially separated in an oblique direction; an oblique four-point separation pattern in which light is separated into four light beams that are spatially separated in oblique directions; a square four-point separation pattern in which light is separated into four light beams that are spatially separated in the horizontal direction and the vertical direction; and the like. When the numerical aperture is small and the ineffective portions of respective pixels have a large area as in the case of a transmission liquid crystal light valve, the ineffective portions cannot be covered sufficiently by employing either of the above-described two-point separation patterns, so that an effect of making the pixel grid inconspicuous cannot be exhibited sufficiently. On the other hand, when the oblique four-point separation pattern is employed, vertical lines or horizontal lines on a projected image are jagged, resulting in deteriorated image quality. On this account, the square four-point separation pattern is most suitable as a pattern in which the respective pixels are separated spatially on a projected image to allow the pixel grid to be made inconspicuous. Since light emitted from a liquid crystal light valve is polarized linearly, the square four-point separation pattern conventionally has been achieved by using the first quarter-wave plate 4, the first birefringent plate 5, the second quarter-wave plate 6, and the second birefringent plate 7, as shown in FIG. 9. In this case, as a material of the birefringent plates, quartz is used, which is a uniaxial optical crystal that absorbs a small amount of light and is excellent in uniformity. As a material of the quarter-wave plates, quartz or an oriented film is used.

However, this configuration requires the use of either four pieces of quartz or two pieces of quartz and two oriented films, resulting in an increase in cost.

DISCLOSURE OF INVENTION

The present invention has been made to solve the above-described problems in the prior art. It is an object of the present invention to provide an inexpensive projection display that allows a pixel grid as ineffective portions of respective pixels of a light valve to be made inconspicuous.

In order to achieve the above object, a projection display according to the present invention includes: a light source; a light valve that is illuminated by light from the light source and forms an image in accordance with a picture signal; a projection lens for projecting the image formed on the light valve on a screen in a magnified state; and a birefringent element for spatially separating the light from the light valve. The birefringent element includes: a first birefringent plate that the light from the light valve enters; a second birefringent plate that light from the first birefringent plate enters; and a third birefringent plate that light from the second birefringent plate enters. In the foregoing projection display, a polarization direction of the light entering the first birefringent plate forms an angle of n×45° (n is an integer other than 0) with an optic axis of the first birefringent plate projected on an incident surface of the first birefringent plate, an optic axis of the second birefringent plate projected on an incident surface of the second birefringent plate is orthogonal to the optic axis of the first birefringent plate projected on the incident surface of the first birefringent plate, and an optic axis of the third birefringent plate projected on an incident surface of the third birefringent plate extends horizontally or vertically.

In the projection display according to the present invention, it is preferable that the light valve includes three light valves corresponding to three primary colors of blue, green, and red, respectively, and that the projection display further includes: a color separation optical system that separates white light from the light source into respective light beams of blue, green, and red so that the blue, green, and red light beams illuminate the three light valves, respectively; and a color combination optical system that receives the blue, green, and red light beams emitted from the three light valves and combines the blue, green, and red light beams.

Furthermore, the projection display according to the present invention preferably further includes an illumination optical system for gathering the light from the light source so that the light illuminates an illuminated region.

Furthermore, in the projection display according to the present invention, it is preferable that the birefringent element is disposed between the light valve and the projection lens.

Furthermore, in the projection display according to the present invention, it is preferable that the birefringent element is disposed on a light-emitting side of the projection lens.

Furthermore, in the projection display according to the present invention, it is preferable that quartz, sapphire, or $LiNbO_3$ is used as a material of the first to third birefringent plates.

Furthermore, in the projection display according to the present invention, it is preferable that the first to third birefringent plates are adhered to each other with an adhesive.

Furthermore, in the projection display according to the present invention, it is preferable that the light valve is a transmission liquid crystal light valve having a fixed-pixel structure.

Furthermore, in the projection display according to the present invention, it is preferable that the light valve is a reflective liquid crystal light valve having a fixed-pixel structure.

Furthermore, in the projection display according to the present invention, it is preferable that a pixel separation pattern achieved by the birefringent element is a square four-point separation pattern.

Furthermore, in the projection display according to the present invention, it is preferable that the light from the light valve is polarized horizontally or vertically.

Furthermore, in the projection display according to the present invention, it is preferable that the light valve is a transmission liquid crystal light valve, and that the birefringent element separates light from the liquid crystal light valve into four light beams that are separated in a horizontal direction and a vertical direction by an amount corresponding to 40% to 50% of a pitch with which fixed pixels of the liquid crystal light valve are arranged.

Furthermore, in the projection display according to the present invention, it is preferable that the light valve is a reflective liquid crystal light valve, and the birefringent element separates light from the liquid crystal light valve into four light beams that are separated in a horizontal direction and a vertical direction by an amount corresponding to 10% to 30% of a pitch with which fixed pixels of the liquid crystal light valve are arranged.

BEST MODE FOR CARRYING OUT THE INVENTION

Hereinafter, the present invention will be described more specifically by way of embodiments.

First Embodiment

Figure 1:
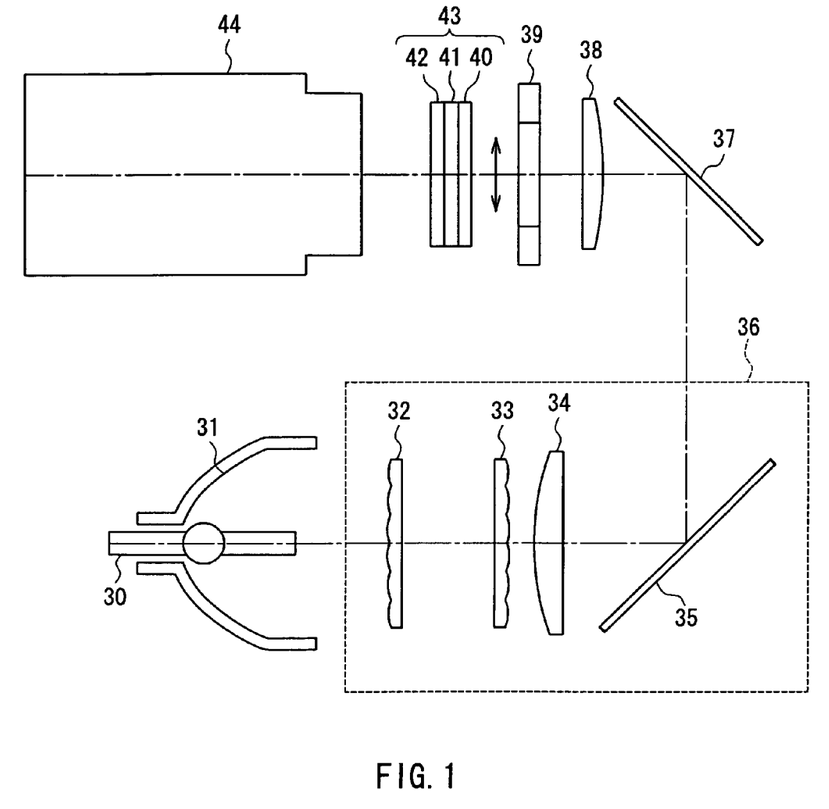
FIG. 1 is a schematic view showing a configuration of a projection display according to a first embodiment of the present invention.

FIG. 1 is a schematic view showing a configuration of a projection display according to a first embodiment of the present invention.

As shown in FIG. 1, the projection display according to the present embodiment includes: a discharge lamp 30 as a light source; an illumination optical system 36 for gathering light from the discharge lamp 30 so that the light illuminates an illuminated region; a transmission liquid crystal light valve 39 that is illuminated by the light from the discharge lamp 30 and forms an image in accordance with a picture signal; a projection lens 44 for projecting the image formed on the liquid crystal light valve 39 on a screen in a magnified state; and a birefringent element 43 that is provided between the liquid crystal light valve 39 and the projection lens 44 and spatially separates the light from the liquid crystal light valve 39. The transmission liquid crystal light valve 39 has a fixed-pixel structure. Furthermore, this liquid crystal light valve 39 is of an active matrix type, and includes liquid crystal that changes the polarization of light incident thereon by controlling a voltage applied to pixels in accordance with a picture signal and two polarizing films disposed on both sides of the liquid crystal so that their transmission axes are orthogonal to each other. By using the liquid crystal and the polarizing films in combination, the liquid crystal light valve 39 modulates light incident thereon to form an image. In FIG. 1, reference numeral 31 denotes a parabolic mirror for gathering light from the discharge lamp 30 to convert it into substantially parallel light, reference numeral 37 denotes a reflecting mirror, and reference numeral 38 denotes a field lens. As the discharge lamp 30, an extra-high pressure mercury lamp, a xenon lamp, and the like may be used, for example.

The illumination optical system 36 includes a first lens array plate 32 including a plurality of lenses, a second lens array plate 33 also including a plurality of lenses, a condenser lens 34, and a reflecting mirror 35, which are arranged from the discharge lamp 30 side toward the reflecting mirror 37 side in this order. The first lens array plate 32 splits a light beam incident thereon into many light beams, and the many light beams thus obtained are converged on the second lens array plate 33. Each lens of the first lens array plate 32 has an aperture in a shape similar to that of the liquid crystal light valve 39. Furthermore, the power of the lenses of the second array plate 33 is determined so that the first lens array plate 32 and the liquid crystal light valve 39 have a substantially conjugate relationship. The condenser lens 34 is provided for overlapping the light beams emitted from the respective lenses of the second lens array plate 33 so that the liquid crystal light valve 39 is illuminated by the thus overlapped light beams. By using the illumination optical system 36 configured as above, the gathered light from the discharge lamp 30 can illuminate the liquid crystal light valve 39 uniformly with high efficiency.

The birefringent element 43 includes a first birefringent plate 40 that light from the liquid crystal light valve 39 enters, a second birefringent plate 41 that light from the first birefringent plate 40 enters, and a third birefringent plate 42 that light from the second birefringent plate 41 enters, which are arranged from the liquid crystal light valve 39 side toward the projection lens 44 side in this order. The birefringent element 43 separates light from the liquid crystal light valve 39 into four light beams that are spatially separated in the horizontal direction and the vertical direction. The first to third birefringent plates 40, 41, and 42 are adhered to each other with an ultraviolet curable adhesive or a thermosetting adhesive. Since the first to third birefringent plates 40, 41, and 42 are adhered to each other with an adhesive having a refractive index that does not greatly differ from those of these plates, optical losses at the respective interfaces can be reduced. The size of the principal plane of the birefringent element 43 is 22 mm×24 mm.

Figure 2:
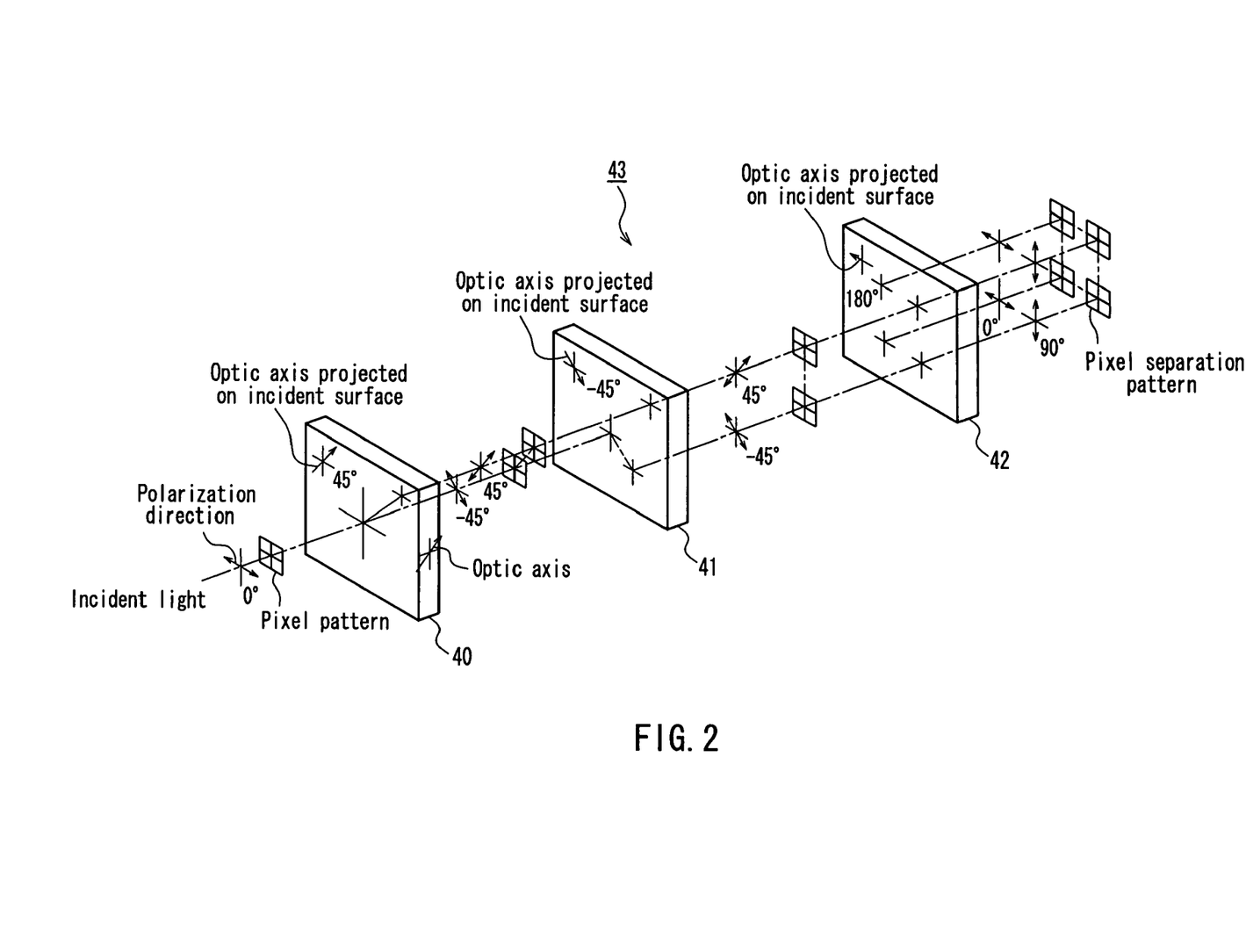
FIG. 2 is an exploded perspective view showing a configuration and an operation of a birefringent element according to an embodiment of the present invention.

Hereinafter, the configuration and operation of the birefringent element will be described in detail. FIG. 2 is an exploded perspective view showing the configuration and operation of the birefringent element, and FIGS. 3A to 3D are conceptual diagrams showing the operation of achieving a square four-point separation of a pixel pattern.

As a material of the first to third birefringent plates 40, 41, and 42 included in the birefringent element 43, quartz, which is a uniaxial optical crystal, is used. Quartz exhibits no light absorption in the visible spectrum and has a high uniformity. When the first to third birefringent plates 40, 41, and 42 are formed using quartz, each of these plates are configured so that its optic axis forms an angle of 45° with the principal surface, in order to allow a separation amount of light per unit thickness to be largest. FIG. 2 shows a single pixel pattern as an example of incident light to explain appearances of light polarization, light separation directions, and a separation pattern. In FIG. 2, on each of the first to third birefringent plates 40, 41, and 42, an arrow indicating the direction of the optic axis projected on an incident surface thereof is shown. In this drawing, light emitted from the liquid crystal light valve 39 (i.e., incident light) is shown as linearly polarized light in the horizontal direction, i.e., in the 0° direction.

As shown in FIG. 2, when a two-dimensional rectangular coordinate system in which an x-axis indicates a horizontal direction is defined on the incident surface of the first birefringent plate 40, the first birefringent plate 40 is configured so that an optic axis of the first birefringent plate 40 projected on the incident surface thereof is oriented at 45° relative to the +x-axis. Accordingly, the polarization direction of the light from the liquid crystal light valve 39 (i.e., the incident light) forms an angle of 45° with the optic axis of the first birefringent plate 40 projected on the incident surface thereof. The light that has entered the first birefringent plate 40 is separated into ordinary rays and extraordinary rays depending on its polarization. More specifically, polarized light orthogonal to the optic axis of the first birefringent plate 40 projected on the incident surface thereof becomes ordinary rays, while polarized light parallel to the optic axis becomes extraordinary rays. Thus, the light that has entered the first birefringent plate 40 is separated into linearly polarized light in the −45° direction and linearly polarized light in the 45° direction relative to +x-axis, thereby giving two pixel patterns separated in the 45° direction relative to the +x-axis (see FIGS. 3A and 3B). The separation amount of light is determined depending on the thickness of a birefringent plate.

The separation amount d of light is represented by Equation 1 below, where t is a thickness of a birefringent plate, θ is an angle formed by the principal surface and the optic axis of the birefringent plate, $n_e$ is a refractive index with respect to extraordinary rays, and $n_o$ is a refractive index with respect to ordinary rays.

$$d=(n_e^2-n_o^2)t\cdot\sin\theta\cos\theta/(n_e^2\sin^2\theta+n_o^2\cos^2\theta) \quad \text{[Equation 1]}$$

Therefore, when an angle formed by the principal surface and the optic axis of the birefringent plate is 45° as in the present embodiment, the separation amount d of light is represented by Equation 2 below.

$$d=(n_e^2-n_o^2)t/(n_e^2+n_o^2) \quad \text{[Equation 2]}$$

Furthermore, when quartz is used as a material of the birefringent plate as in the present embodiment, $n_e=1.5553$ and $n_o=1.5462$.

Figure 3A:
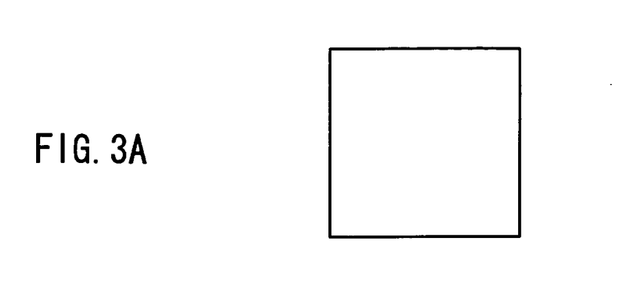
FIGS. 3A to 3D are conceptual diagrams showing an operation of achieving a square four-point separation of a pixel pattern according to an embodiment of the present invention.
Figure 3B:
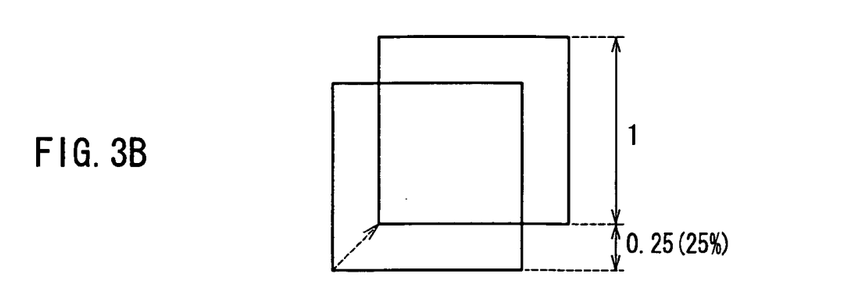
Figure 3C:
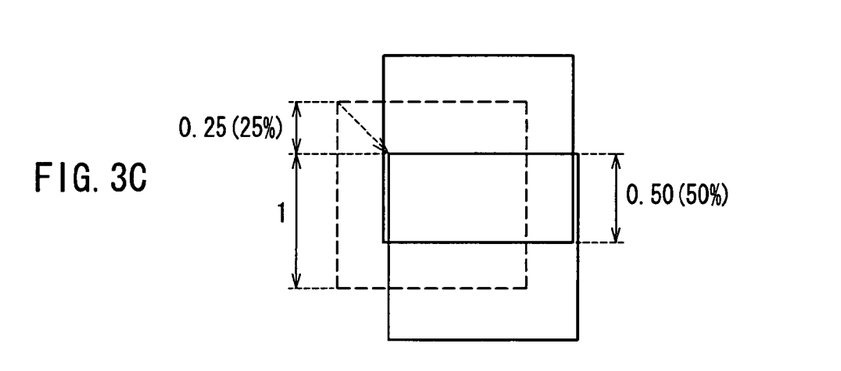
Figure 3D:
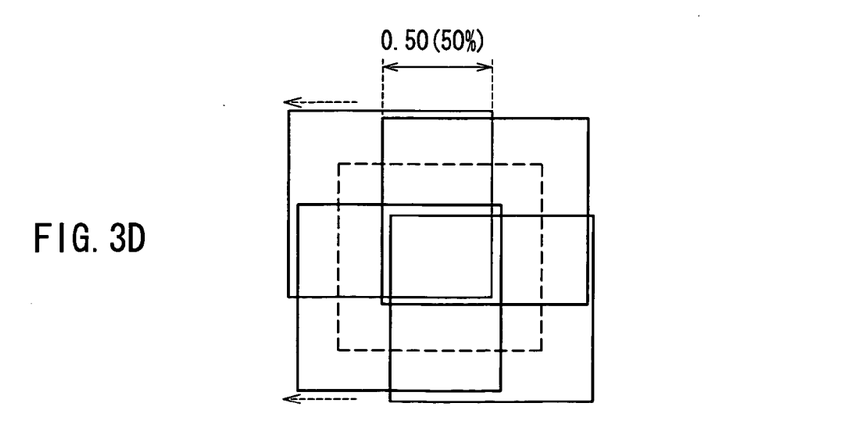

In the present embodiment, the first birefringent plate 40 is configured so that the separation amount of light in the 45° direction relative to the +x-axis corresponds to $(\sqrt{2}\times25)\%$ of the pixel pitch (see FIG. 3B).

The respective light beams obtained through the light separation by the first birefringent plate 40 then enter the second birefringent plate 41. The second birefringent plate 41 is configured so that an optic axis of the second birefringent plate 41 projected on the incident surface thereof is oriented at −45° relative to the +x-axis (i.e., so that the optic axis of the second birefringent plate 41 is orthogonal to the optic axis of the first birefringent plate 40 projected on the incident surface thereof). Thus, the extraordinary rays are the only incident light of linearly polarized light in the −45° direction, which is separated in the −45° direction relative to the +x-axis. In the present embodiment, the second birefringent plate 41 is configured so that the separation amount of light in the −45° direction relative to the +x-axis corresponds to (√2×25)% of the pixel pitch (see FIG. 3C). On the other hand, incident light of linearly polarized light in the 45° direction relative to the +x-axis passes through the second birefringent plate 41 as it is without being separated. Thus, after passing through the second birefringent plate 41, two pixel patterns that are separated in the vertical direction are obtained (see FIG. 3C). In this case, the separation amount in the vertical direction corresponds to 50% of the pixel pitch.

The respective light beams obtained through the light separation by the second birefringent plate 41 then enter the third birefringent plate 42. The third birefringent plate 42 is configured so that an optic axis of the third birefringent plate 42 projected on the incident surface thereof is oriented at 180° relative to the +x-axis. The light beams entering the third birefringent plate 42 are linearly polarized light beams in the 45° direction and the −45° direction relative to the +x-axis. Each of these light beams is separated into ordinary rays and extraordinary rays to be separated in the horizontal direction (see FIG. 3D). In the present embodiment, the third birefringent plate 42 is configured so that the separation amount of light in the horizontal direction corresponds to 50% of the pixel pitch (see FIG. 3D).

In the above-described manner, a single pixel pattern that has entered the birefringent element 43 is separated in the horizontal direction and the vertical direction to give four pixel patterns forming a square four-point separation pattern after having passed through the first to third birefringent plates 40, 41, and 42 in this order.

Next, the operation of the above-described projection display according to the present embodiment will be described with reference to FIG. 1.

Light emitted from the discharge lamp 30 is gathered and converted into substantially parallel light by the parabolic mirror 31. The thus-obtained substantially parallel light then enters the first lens array plate 32. The light beam that has entered the first lens array plate 32 is split into many light beams, which are then converged on the second lens array plate 33. The light beams emitted from the respective lenses of the second lens array plate 33 pass through the condenser lens 34 and are reflected by the reflecting mirror 35 and then by the reflecting mirror 37. Thereafter, the light beams further pass through the field lens 38 and then are overlapped with each other to illuminate the liquid crystal light valve 39. The light that has passed through the liquid crystal light valve 39 enters the birefringent element 43 including the first to third birefringent plates 40, 41, and 42. By the action of the first to third birefringent plates 40, 41, and 42, the light are separated in the horizontal direction and the vertical direction by a separation amount corresponding to 50% of the pixel pitch to give four light beams forming a square four-point separation pattern. Thereafter, the light beams are projected on a screen in a magnified state through the projection lens 44. This allows an image formed on the liquid crystal light valve 39 to be displayed on the screen with the pixel grid being made inconspicuous.

Figure 4:
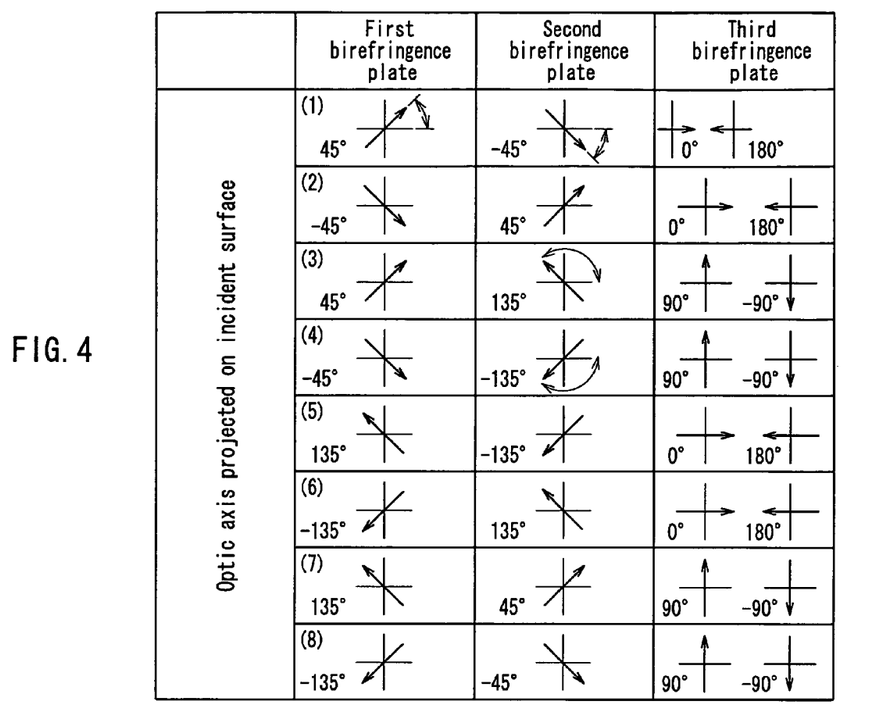
FIG. 4 is a diagram showing combinations of optic axes projected on respective incident surfaces of first to third birefringent plates, applicable to obtain a square four-point separation pattern according to an embodiment of the present invention.

FIG. 4 shows combinations of optic axes projected on incident surfaces of the first to third birefringent plates 40, 41, and 42, applicable to obtain a square four-point separation pattern. The effect of the present invention can be obtained by any of the combinations shown in FIG. 4. Therefore, the birefringent element 43 may be produced using the combination that allows the least expensive processing of the birefringent plates.

Figure 5A:
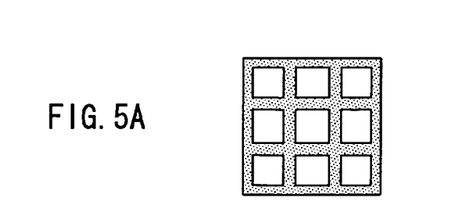
FIGS. 5A and 5B are diagrams showing an appearance of a pixel grid on a projected image, which illustrate an effect of the present invention (FIG. 5A shows the appearance in the case where no birefringent element is provided, while FIG. 5B shows the appearance in the case where a birefringent element is provided).
Figure 5B:
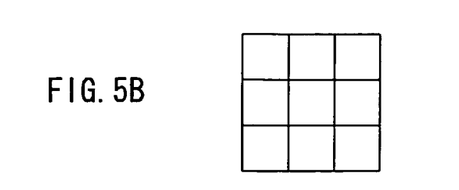

FIGS. 5A and 5B show an appearance of a pixel grid on a projected image. More specifically, FIG. 5A shows an appearance of a pixel grid on a projected image in the case where the birefringent element 43 is not provided, while FIG. 5B shows an appearance of a pixel grid on a projected image in the case where the birefringent element 43 is provided. As can be seen from FIGS. 5A and 5B, when the birefringent element 43 is provided, each of the pixels is separated in the horizontal direction and the vertical direction to give four pixels forming a square four-point separation pattern, thereby allowing the pixel grid to be made inconspicuous. Therefore, by using a projection display according to the present embodiment, it becomes possible to obtain smooth and natural projected images.

As described above, according to the present embodiment, in order to make the pixel grid on a projected image inconspicuous, the birefringent element 43 including the first to third birefringent plates 40, 41, and 42 is used as a pixel separation optical element for spatially separating light so as to form a square four-point separation pattern. Thus, it is possible to provide an inexpensive projection display that allows high-quality, smooth images to be obtained.

The present embodiment has described an example where light entering the birefringent element 43 is polarized in the horizontal direction, i.e., the 0° direction. However, it is to be noted that also in the case where light entering the birefringent element 43 is polarized in the vertical direction, i.e., the 90° direction, the pixel pattern can be separated in the horizontal direction and the vertical direction to form a square four-point separation pattern by providing the birefringent element 43.

Figure 6:
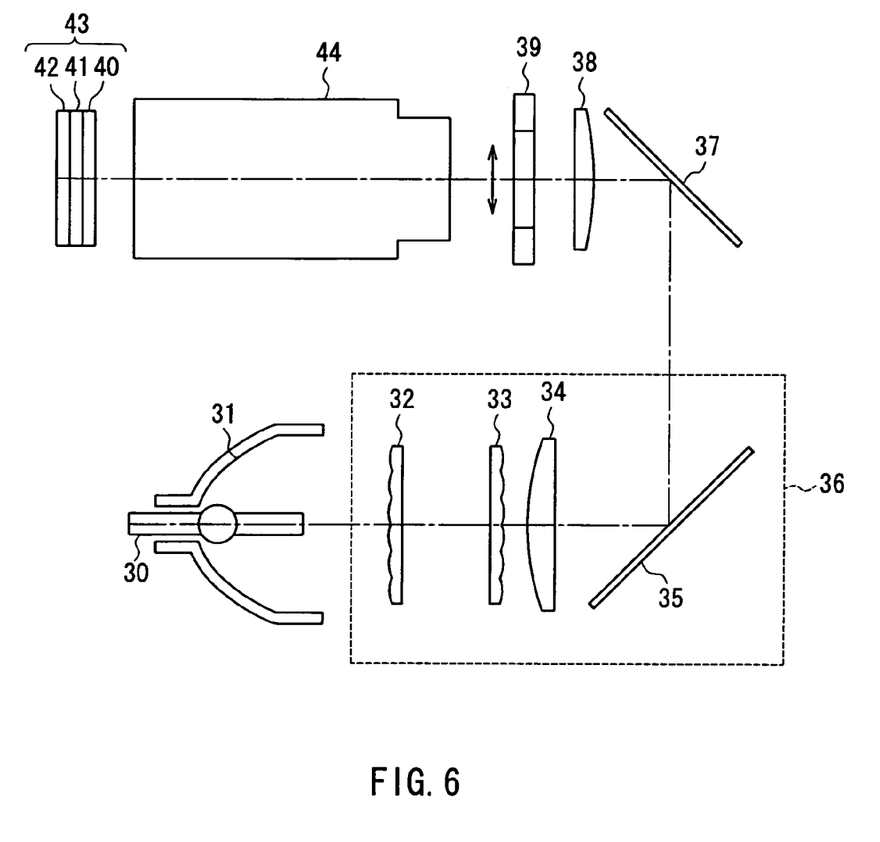
FIG. 6 is a schematic view showing a configuration of another projection display according to the first embodiment of the present invention.

Furthermore, while the present embodiment has described an example where the birefringent element 43 is disposed between the liquid crystal light valve 39 and the projection lens 44, the birefringent element 43 may be disposed on the light-emitting side of the projection lens 44 (i.e., between the projection lens 44 and the screen) as shown FIG. 6. When the birefringent element 43 is disposed on the light-emitting side of the projection lens 44, an incident angle of light entering the central portion of the birefringent element 43 is different from that of light entering the peripheral portion of the birefringent element 43. Thus, on the screen, a square separation pattern is seen on the central portion while a slightly diamond-shaped separation pattern is seen on the peripheral portion. In this case, however, an effect of making a pixel grid inconspicuous still is obtained. Moreover, by disposing the birefringent element 43 on the light-emitting side of the projection lens 44, it becomes possible to attach/detach the birefringent element 43 easily. Thus, there is convenience in that whether the birefringent element 43 is disposed or not can be changed easily depending on the angle of view or the kind of projected image (motion picture image or still picture image).

Furthermore, the present embodiment has described an example where the separation amounts of the pixel pattern in the horizontal direction and the vertical direction correspond to 50% of the pixel pitch. However, it is to be noted that the separation amounts of the pixel pattern in the horizontal direction and the vertical direction when a transmission liquid crystal light valve 39 is used may vary as long as they are within the range from 40% to 60% of the pixel pitch. When the separation amounts are less than 40% of the pixel pitch, it is difficult to make the pixel grid sufficiently inconspicuous. On the other hand, when the separation amounts are more than 60% of the pixel pitch, the resolution decreases significantly, resulting in deteriorated image quality.

Furthermore, while the present embodiment has described an example where quartz, which is relatively inexpensive, is used as a material of the first to third birefringent plates 40, 41, and 42, other uniaxial optical crystals such as sapphire also may be used. Sapphire has an excellent heat dissipation capability. Thus, by using sapphire as a material of the first to third birefringent plates 40, 41, and 42, it is possible to improve the thermal reliability of an adhesive used for adhering these birefringent plates. As a material of the first to third birefringent plates 40, 41, and 42, $LiNbO_3$ also may be used. $LiNbO_3$ has a higher refractive index than quartz. Specifically, $LiNbO_3$ has a refractive index of 2.20 with respect to extraordinary rays and a refractive index of 2.23 with respect to ordinary rays. Thus, by using $LiNbO_3$, the thicknesses of the first to third birefringent plates 40, 41, and 42 can be reduced to about ⅙ of those in the case where quartz is used. Accordingly, when the birefringent element 43 is disposed between the liquid crystal light valve 39 and the projection lens 44, the variation in the back focus position can be made smaller. Therefore, the adjustment of the back focus position depending on the presence or absence of the birefringent element 43 can be achieved merely by adjusting the focus of the projection lens 44. Moreover, when the first to third birefringent plates 40, 41, and 42 have small thicknesses, the birefringent element 43 can be disposed between the liquid crystal light valve 39 and the projection lens 44 easily even in the case where there is only a very small space between the liquid crystal light valve 39 and the projection lens 44. It is to be noted here that the first to third birefringent plates 40, 41, and 42 are not limited to those formed using an optical crystal, and may be formed using a liquid crystal, for example.

Second Embodiment

In the first embodiment described above, an example where a transmission liquid crystal light valve is used as a light valve has been described. However, a reflective liquid crystal light valve having a fixed-pixel structure also may be used as a light valve. Hereinafter, a projection display employing a reflective liquid crystal light valve will be described with reference to FIG. 7.

Figure 7:
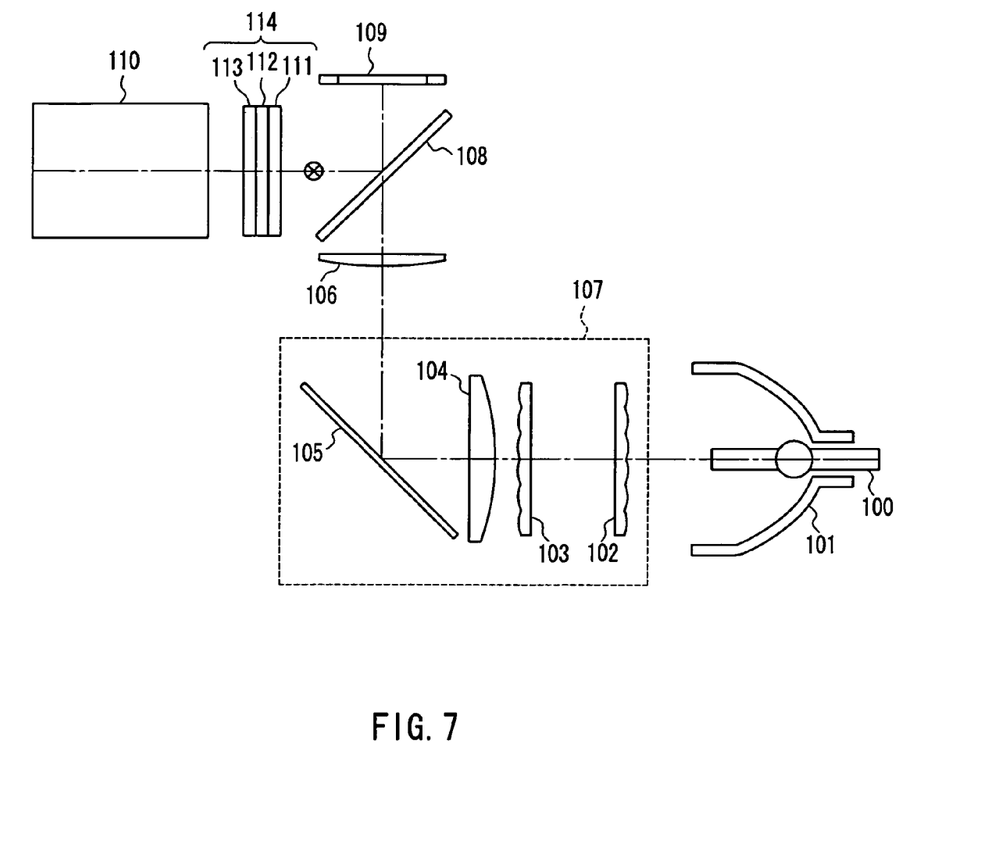
FIG. 7 is a schematic view showing a configuration of a projection display according to a second embodiment of the present invention.

As shown in FIG. 7, a projection display according to the present embodiment includes: a discharge lamp 100 as a light source; an illumination optical system 107 for gathering light from the discharge lamp 100 so that the light illuminates an illuminated region; a reflective liquid crystal light valve 109 that is illuminated by the light from the discharge lamp 100 and forms an image in accordance with a picture signal; a projection lens 110 for projecting the image formed on the liquid crystal light valve 109 on a screen in a magnified state; and a birefringent element 114 that is provided between the liquid crystal light valve 109 and the projection lens 110 and spatially separates the light from the liquid crystal light valve 109. The reflective liquid crystal light valve 109 includes blue, green, and red color filters provides for each pixel. Furthermore, the reflective liquid crystal light valve 109 is of an active matrix type, and includes a liquid crystal layer and a reflective film. As the liquid crystal layer, 45-degree twisted nematic liquid crystal is used. In the reflective liquid crystal light valve 109, the birefringence of the liquid crystal varies by controlling a voltage applied to pixels in accordance with a picture signal.

The light that has entered the reflective liquid crystal light valve 109 passes through the liquid crystal layer and then is reflected by the reflective film to pass through the liquid crystal layer again, during which the p-polarized light is changed into the s-polarized light by the birefringence of the liquid crystal. Thereafter, the s-polarized light is emitted from the liquid crystal light valve 109. In FIG. 7, reference numeral 101 denotes a parabolic mirror for gathering light from the discharge lamp 100 to convert it into substantially parallel light, reference numeral 106 denotes a field lens for gathering light illuminating the liquid crystal light valve 109 on the projection lens 110, and reference numeral 108 denotes a wiregrating polarized-light separating element that transmit light that is p-polarized with respect to the incident surface thereof and reflects light that is s-polarized with respect to the incident surface thereof. The wiregrating polarized-light separating element 108 is obtained by forming a metal grating on a glass substrate using, for example, aluminum or the like so that the grating period of the metal grating is sufficiently small (100 to 150 nm) with respect to a wavelength of incident light. The wire grating polarized-light separating element 108 reflects light having an electric-field component vibrating in the direction perpendicular to the direction of the grating period and transmits light having an electric-field component vibrating in the direction parallel to the direction of the grating period. In the wiregrating polarized-light separating element 108, variations in the transmittance and reflectance depending on an incident angle are smaller than those in a thin polarized-light separating prism utilizing the Brewster's angle. Thus, the wiregrating polarized-light separating element 108 can separate polarized light with high efficiency. Furthermore, as the discharge lamp 100, an extra-high pressure mercury lamp, a xenon lamp, and the like may be used, for example.

The illumination optical system 107 includes a first lens array plate 102 including a plurality of lenses, a second lens array plate 103 also including a plurality of lenses, a condenser lens 104, and a reflecting mirror 105, which are arranged from the discharge lamp 100 side toward the wiregrating polarized-light separating element 108 side in this order. The configuration of this illumination optical system 107 is the same as that of the illumination optical system 36 in the above-described first embodiment. Therefore, the detailed description thereof is omitted herein.

The birefringent element 114 includes a first birefringent plate 111 that light from the liquid crystal light valve 109 enters, a second birefringent plate 112 that light from the first birefringent plate 111 enters, and a third birefringent plate 113 that light from the second birefringent plate 112 enters, which are arranged from the liquid crystal light valve 109 side toward the projection lens 110 side in this order. The configuration of this birefringent element 114 is almost the same as that of the birefringent element 43 in the above-described first embodiment. Therefore, the detailed description thereof is omitted herein.

Next, the operation of the above-described projection display according to the present embodiment will be described with reference to FIG. 7.

Light emitted from the discharge lamp 100 is gathered and converted into substantially parallel light by the parabolic mirror 101. The thus-obtained substantially parallel light then enters the first lens array plate 102. The light beam that has entered the first lens array plate 102 is split into many light beams, which are then converged on the second lens array plate 103. The light beams emitted from the respective lenses of the second lens array plate 103 pass through the condenser lens 104 and are reflected by the reflecting mirror 105 to pass through the field lens 106. The light beams that have passed through the field lens 106 enter the wiregrating polarized-light separating element 108, by which light that is p-polarized with respect to the incident surface thereof is allowed to pass while light that is s-polarized with respect to the incident surface thereof is reflected, thereby giving two polarized light beams orthogonal to each other. The p-polarized light that has passed through the wiregrating polarized-light separating element 108 enters the reflective liquid crystal light valve 109. The light that has entered the reflective liquid crystal light valve 109 passes through the liquid crystal layer and then is reflected by the reflective film to pass through the liquid crystal layer again, during which the p-polarized light is changed into the s-polarized light by the birefringence of the liquid crystal. Thereafter, the s-polarized light is emitted from the reflective liquid crystal light valve 109. The s-polarized light emitted from the reflective liquid crystal light valve 109 is reflected by the wiregrating polarized-light separating element 108 and enters the birefringent element 114 including the first to third birefringent plates 111, 112, and 113. By the action of the first to third birefringent plates 111, 112, and 113, the light beams are separated in the horizontal direction and the vertical direction to give four light beams forming a square four-point separation pattern. Thereafter, the light beams are projected on a screen in a magnified state through the projection lens 110. On the other hand, the p-polarized light whose polarization is not changed by the reflective liquid crystal light valve 109 returns to the illumination optical system 107 side after passing through the wiregrating polarized-light separating element 108. In this manner, optical images formed by the reflective liquid crystal light valve 109 as changes of polarization of light are projected on the screen in a magnified state, thereby forming full color projected images.

Generally, reflective liquid crystal light valves have a numerical aperture as high as about 90% and thus have a small ineffective pixel area. Therefore, a pixel grid on a projected image obtained by using a reflective liquid crystal light valve is less conspicuous than that on a projected image obtained by using a transmission liquid crystal light valve. However, even in the case where a reflective liquid crystal light valve is used, a pixel grid on a projected image may be somewhat conspicuous depending on the angle of view. Therefore, in a projection display employing a reflective liquid crystal light valve, it becomes possible to obtain smoother images of high quality by providing a birefringent element. Moreover, when a reflective liquid crystal light valve is used, it is possible to increase the number of pixels. This is because downsizing of a reflective liquid crystal light valve does not cause a decrease in the numerical aperture, unlike the case of a transmission liquid crystal light valve. Furthermore, suitable separation amounts of a pixel pattern in the horizontal direction and the vertical direction when a reflective liquid crystal light valve is used are about 10% to 30% of the pixel pitch.

Also, in a projection display employing a light valve that causes deflection using a mirror as a light valve having a fixed-pixel structure, it is possible to obtain smoother images of high quality by providing a birefringent element.

Third Embodiment

Figure 8:
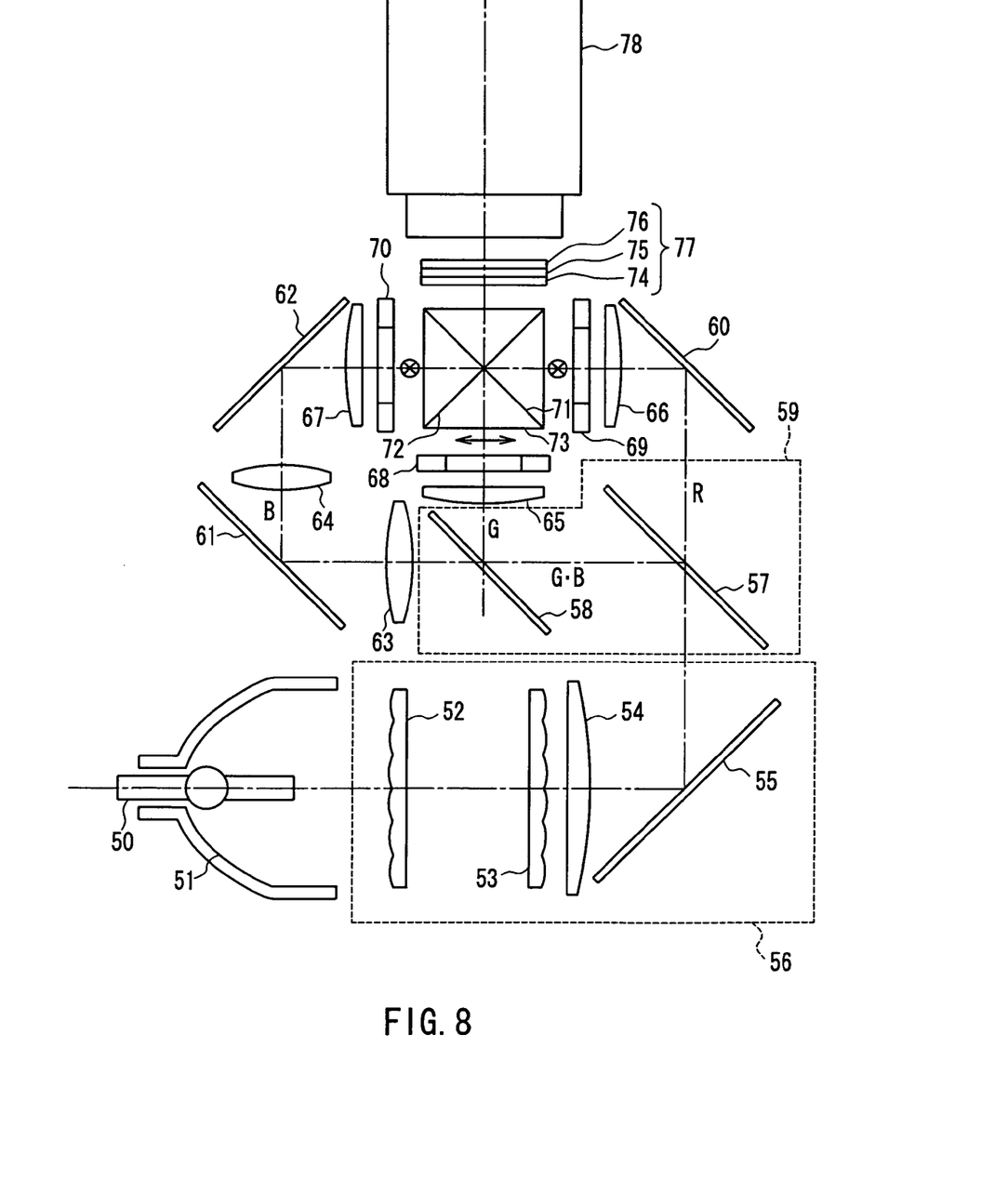
FIG. 8 is a schematic view showing a configuration of a projection display according to a third embodiment of the present invention.

FIG. 8 is a schematic view showing a configuration of a projection display according to a third embodiment of the present invention.

As shown in FIG. 8, the projection display according to the present embodiment includes: a discharge lamp 50 as a light source; an illumination optical system 56 for gathering light from the discharge lamp 50 so that the light illuminates an illuminated region; three transmission liquid crystal light valves 68, 69, and 70 corresponding to three primary colors of blue, green, and red, respectively, that are illuminated by the light from the discharge lamp 50 and form images in accordance with a picture signal, respectively; a color separation optical system 59 that separates white light from the discharge lamp 50 into respective light beams of blue, green, and red so that these blue, green, and red light beams illuminate the liquid crystal light valves 68, 69, and 70, respectively; a dichroic prism 73 as a color combination optical system that receives the blue, green, and red light beams emitted from the liquid crystal light valves 68, 69, and 70, respectively, and combines these blue, green, and red light beams; a projection lens 78 for projecting the images formed on the liquid crystal light valves 68, 69, and 70 on a screen in a magnified state; and a birefringent element 77 that is provided between the dichroic prism 73 and the projection lens 78 and spatially separates the light beams from the liquid crystal light valves 68, 69, and 70. Each of the above-described three liquid crystal light valves 68, 69, and 70 has a fixed-pixel structure. Furthermore, each of these liquid crystal light valves 68, 69, and 70 is of an active matrix type, and includes a liquid crystal layer that changes the polarization of light incident thereon by controlling a voltage applied to pixels in accordance with a picture signal and two polarizing films disposed on both sides of the liquid crystal layer so that their transmission axes are orthogonal to each other. By using the liquid crystal layer and the two polarizing films in combination, the liquid crystal light valves 68, 69, and 70 modulate light beams incident thereon to form images of blue, green, and red, respectively. In FIG. 8, reference numeral 51 denotes a parabolic mirror for gathering the light from the discharge lamp 50 to convert it into substantially parallel light, reference numerals 60, 61, and 62 denote reflecting mirrors, reference numerals 63 and 64 denote relay lenses, and reference numerals 65, 66, and 67 denote field lenses. As the discharge lamp 50, an extra-high pressure mercury lamp, a xenon lamp, and the like may be used, for example.

The illumination optical system 56 includes a first lens array plate 52 including a plurality of lenses, a second lens array plate 53 also including a plurality of lenses, a condenser lens 54, and a reflecting mirror 55, which are arranged from the discharge lamp 50 side toward the color separation optical system 59 side in this order. The configuration of this illumination optical system 56 is the same as that of the illumination optical system 36 in the above-described first embodiment. Therefore, the detailed description thereof is omitted herein.

The color separation optical system 59 includes a red-transmitting dichroic mirror 57 and a green-reflecting dichroic mirror 58.

The dichroic prism 73 as color combination optical system includes a red-reflecting dichroic mirror 71 and a blue-reflecting dichroic mirror 72.

The birefringent element 77 includes a first birefringent plate 74 that light from the liquid crystal light valves 68, 69, and 70 enters, a second birefringent plate 75 that light from the first birefringent plate 74 enters, and a third birefringent plate 76 that light from the second birefringent plate 75 enters, which are arranged from the side of the liquid crystal light valves 68, 69, and 70 toward the projection lens 78 side in this order. The configuration of this birefringent element 77 is the same as that of the birefringent element 43 in the above-described first embodiment. Therefore, the detailed description thereof is omitted herein.

Next, the operation of the above-described projection display according to the present embodiment will be described with reference to FIG. 8.

Light emitted from the discharge lamp 50 is gathered and converted into substantially parallel light by the parabolic mirror 51. The thus-obtained substantially parallel light then enters the first lens array plate 52. The light beam that has entered the first lens array plate 52 is split into many light beams, which are then converged on the second lens array plate 53. The light beams emitted from the respective lenses of the second lens array plate 53 pass through the condenser lens 54 and are reflected by the reflecting mirror 55 to enter the color separation optical system 59. The light beams that have entered the color separation optical system 59 are separated into respective light beams of blue, green, and red by the red-transmitting dichroic mirror 57 and the green-reflecting dichroic mirror 58. The green light beam passes through the field lens 65 and then enters the liquid crystal light valve 68 corresponding to green. The red light beam is reflected by the reflecting mirror 60 to pass through the field lens 66 and then enters the liquid crystal light valve 69 corresponding to red. The blue light beam passes through the relay lenses 63 and 64 and the field lens 67 through the reflection by the reflection mirrors 61 and 62 and then enters the liquid crystal light valve 70 corresponding to blue. The light beams of respective colors that have passed through the liquid crystal light valves 68, 69, and 70 then enter the dichroic prism 73 as color combination optical system, in which the red light beam is reflected by the red-reflecting dichroic mirror 71 and the blue light beam are reflected by the blue-reflecting dichroic mirror 72 so that the red light beam and the blue light beam are combined with the green light beam. In FIG. 8, the polarization directions of the light beams emitted from the liquid crystal light valves 68, 69, and 70 are indicated. More specifically, polarized light beam in the horizontal direction is used as the green light beam, while polarized light beams in the vertical direction are used as the red and blue light beams. This is because, in the dichroic mirrors 71 and 72, when the transmitted green light beam is a p-polarized light beam and the reflected red and blue light beams are s-polarized light beams, spectral characteristics capable of achieving a high reflectance and a high transmittance can be obtained. The light beam emitted from the dichroic prism 73 enters the birefringent element 77 including the first to third birefringent plates 74, 75, and 76. By the action of the first to third birefringent plates 74, 75, and 76, the light beam is separated in the horizontal direction and the vertical direction by a separation amount corresponding to 50% of the pixel pitch to give four light beams forming a square four-point separation pattern. Thereafter, the light beams are projected on a screen in a magnified state through the projection lens 78. Therefore, according to the projection display of the present embodiment, an image obtained by combining the respective color images formed on the liquid crystal light valves 68, 69, and 70 can be displayed on the screen with the pixel grid being made inconspicuous.

As specifically described above, a projection display according to the present embodiment includes three liquid crystal light valves corresponding to three primary colors of blue, green, and red and an illumination optical system that allows the respective light valves to be illuminated by light from a light source uniformly and efficiently. Therefore, it is possible to obtain bright projected images with high resolution.

In the above-described respective embodiments, an illumination optical system that allows a light valve(s) to be illuminated by light from a light source uniformly and efficiently includes two lens array plates. However, the illumination optical system may be configured using a rod lens and a condenser lens.

INDUSTRIAL APPLICABILITY

As specifically described above, according to the present invention, an inexpensive projection display that allows high-quality, smooth projected images on which a pixel grid is made inconspicuous to be obtained can be provided by providing a birefringent element including three birefringent plates in the projection display.

The invention claimed is:
1. A projection display comprising:
a light source;
a light valve that is illuminated by light from the light source and forms an image in accordance with a picture signal;
a projection lens for projecting the image formed on the light valve on a screen in a magnified state; and
a birefringent element for spatially separating the light from the light valve, the birefringent element comprising:
    a first birefringent plate that the light from the light valve enters;
    a second birefringent plate that light from the first birefringent plate enters; and
    a third birefringent plate that light from the second birefringent plate enters,
wherein a polarization direction of the light entering the first birefringent plate forms an angle of n×45° (n is an odd number) with an optic axis of the first birefringent plate projected on an incident surface of the first birefringent plate.
an optic axis of the second birefringent plate projected on an incident surface of the second birefringent plate is orthogonal to the optic axis of the first birefringent plate projected on the incident surface of the first birefringent plate, and
an optic axis of the third birefringent plate projected on an incident surface of the third birefringent plate is parallel or orthogonal to the polarization direction of the light entering the first birefringent plate, thereby allowing a pixel grid as ineffective portions of respective pixels of a light valve to be made inconspicuous on a projected image,
wherein the light valve is a reflective liquid crystal light valve, and the birefringent element separates light from the liquid crystal light valve into four light beams that are separated in a horizontal direction and a vertical direction by an amount corresponding to 10% to 30% of a pitch with which fixed pixels of the liquid crystal light valve are arranged.
2. The projection display according to claim 1, wherein the light valve comprises three light valves corresponding to three primary colors of blue, green, and red, respectively,
the projection display further comprising:
a color separation optical system that separates white light from the light source into respective light beams of blue, green, and red so that the blue, green, and red light beams illuminate the three light valves, respectively; and a color combination optical system that receives the blue, green, and red light beams emitted from the three light valves and combines the blue, green, and red light beams.

3. The projection display according to claim 1, further comprising an illumination optical system for gathering the light from the light source so that the light illuminates an illuminated region.

4. The projection display according to claim 1, wherein the birefringent element is disposed between the light valve and the projection lens.

5. The projection display according to claim 1, wherein the birefringent element is disposed on a light-emitting side of the projection lens.

6. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at 45° relative to a +x-axis,
the optic axis of the second birefringent plate projected on the incident surface of the second birefringent plate is oriented at −45° relative to the +x-axis, and
the optic axis of the third birefringent plate projected on the incident surface of the third birefringent plate is oriented at 0° or 180° relative to the +x-axis.

7. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at −45° relative to a +x-axis,
the optic axis of the second birefringent plate projected on the incident surface of the second birefringent plate is oriented at 45° relative to the +x-axis, and
the optic axis of the third birefringent plate projected on the incident surface of the third birefringent plate is oriented at 0° or 180° relative to the +x-axis.

8. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at 45° relative to a +x-axis,
the optic axis of the second birefringent plate projected on the incident surface of the second birefringent plate is oriented at 135° relative to the +x-axis, and
the optic axis of the third birefringent plate projected on the incident surface of the third birefringent plate is oriented at 90° or −90° relative to the +x-axis.

9. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at −45° relative to a +x-axis,
the optic axis of the second birefringent plate projected on the incident surface of the second birefringent plate is oriented at −135° relative to the +x-axis, and
the optic axis of the third birefringent plate projected on the incident surface of the third birefringent plate is oriented at 90° or −90° relative to the +x-axis.

10. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at 135° relative to a +x-axis,
the optic axis of the second birefringent plate projected on the incident surface of the second birefringent plate is oriented at −135° relative to the +x-axis, and
the optic axis of the third birefringent plate projected on the incident surface of the third birefringent plate is oriented at 0° or 180° relative to the +x-axis.

11. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at −135° relative to a +x-axis,
the optic axis of the second birefringent plate projected on the incident surface of the second birefringent plate is oriented at 135° relative to the +x-axis, and
the optic axis of the third birefringent plate projected on the incident surface of the third birefringent plate is oriented at 0° or 180° relative to the +x-axis.

12. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at 135° relative to a +x-axis,
the optic axis of the second birefringent plate projected on the incident surface of the second birefringent plate is oriented at 45° relative to the +x-axis, and
the optic axis of the third birefringent plate projected on the incident surface of the third birefringent plate is oriented at 90° or −90° relative to the +x-axis.

13. The projection display according to claim 1, wherein when a two-dimensional rectangular coordinate system in which an x-axis indicates a horizontal direction is defined on the incident surfaces of the first to third birefringent plates,
the optic axis of the first birefringent plate projected on the incident surface of the first birefringent plate is oriented at −135° relative to a +x-axis,
the optic axis of the second birefringent plate projected on the incident surface of the second birefringent plate is oriented at −45° relative to the +x-axis, and
the optic axis of the third birefringent plate projected on the incident surface of the third birefringent plate is oriented at 90° or −90° relative to the +x-axis.

14. The projection display according to claim 1, wherein quartz is used as a material of the first to third birefringent plates.

15. The projection display according to claim 1, wherein sapphire is used as a material of the first to third birefringent plates.

16. The projection display according to claim 1, wherein $LiNbO_3$ is used as a material of the first to third birefringent plates.

17. The projection display according to claim 1, wherein the first to third birefringent plates are adhered to each other with an adhesive.

18. The projection display according to claim 1, wherein the light valve is a transmission liquid crystal light valve having a fixed-pixel structure.

19. The projection display according to claim 1, wherein the light valve is a reflective liquid crystal light valve having a fixed-pixel structure.

20. The projection display according to claim 1, wherein a pixel separation pattern achieved by the birefringent element is a square four-point separation pattern.

21. The projection display according to claim 1, wherein the light from the light valve is polarized horizontally or vertically.

22. The projection display according to claim 1, wherein the light valve is a transmission liquid crystal light valve, and the birefringent element separates light from the liquid crystal light valve into four light beams that are separated in a horizontal direction and a vertical direction by an amount corresponding to 40% to 50% of a pitch with which fixed pixels of the liquid crystal light valve are arranged.

* * * * *